United States Patent [19]

Forster

[11] 4,024,799

[45] May 24, 1977

[54] AXIAL-PISTON MACHINE WITH IMPROVED BEARING ARRANGEMENT

[75] Inventor: Franz Forster, Muhlbach, Germany

[73] Assignee: Linde Aktiengesellschaft, Wiesbaden, Germany

[22] Filed: Mar. 14, 1975

[21] Appl. No.: 558,273

[30] Foreign Application Priority Data

Mar. 15, 1974 Germany .......................... 2412619

[52] U.S. Cl. ................................................ 91/499
[51] Int. Cl.² ...................................... F01B 13/04
[58] Field of Search ............. 91/486, 499, 504, 506

[56] References Cited

UNITED STATES PATENTS

| 2,525,979 | 10/1950 | Vickers | 91/486 |
| 3,124,079 | 3/1964 | Boyer | 91/486 |
| 3,156,192 | 11/1964 | Austin et al. | 91/507 |
| 3,331,288 | 7/1967 | Kolthoff, Jr. | 91/507 |
| 3,333,478 | 8/1967 | Papst | 91/499 |
| 3,554,095 | 1/1971 | Bobst | 91/486 |
| 3,661,055 | 5/1972 | Pruvot | 91/486 |
| 3,721,161 | 3/1973 | Bobst | 91/486 |
| 3,768,377 | 10/1973 | Engel | 91/486 |
| 3,789,740 | 2/1974 | Boyer | 91/486 |
| 3,862,588 | 1/1975 | Bahrle | 91/486 |

FOREIGN PATENTS OR APPLICATIONS 1,010,679  3/1964  United Kingdom ................. 91/507

*Primary Examiner*—William L. Freeh
*Attorney, Agent, or Firm*—Karl F. Ross; Herbert Dubno

[57] ABSTRACT

The drive flange of an axial-piston machine, which lies in a plane inclined to the axis of the rotatable cylinder drum and is connected to the input or output shaft, is journaled in the housing of the machine in bearings. All of the bearings which take up forces applied to the drive flange are arranged to act directly upon the latter and these bearings include axially effective or thrust bearings. The thrust bearing arrangement includes at least two oppositely directed thrust bearings engaging at least a part of the drive flange between them.

6 Claims, 4 Drawing Figures

AXIAL-PISTON MACHINE WITH IMPROVED BEARING ARRANGEMENT

FIELD OF THE INVENTION

The present invention relates to a system for journaling the drive flange of an axial-piston machine, and, more particularly, to an improvement in axial-piston machines having a drive flange rotatable in the machine housing.

BACKGROUND OF THE INVENTION

Axial-piston machines, such as axial-piston pumps and axial-piston motors comprise a housing having a valve of fluid-distribution plate provided with a pair of kidney shaped ports communicating with an intake fitting and a discharge fitting for the hydraulic medium.

A cylinder drum rotates relative to this plate and is formed with an array of cylinders extending parallel to the axis of rotation of the drum, and successively brought into communication with the ports so that each cylinder bore alternately communicates with one port and the other. Within these cylinder bores there are provided individual pistons whose rods, projecting parallel to the axis of rotation, engage the drive flange or disk of the machine.

This drive disk is diposed in a plane which is inclined to the axis of rotation of the drum and hence to each of the piston rods or stems which are coupled therewith.

A shaft is rigidly fixed to this drive shaft and, in the case of an axial-piston motor, is connected to a load. In the case of an axial-piston pump, this shaft is connected to a driving source such as an electric motor or an internal combustion engine.

When hydraulic fluid is forced into the intake port, therefore, the pistons in the cylinders communicating therewith are driven outwardly and the driving force is transformed into a rotation of the drum and the drive flange to operate a load. Conversely, when the shaft is roatated, the pistons are entrained with the flange and, because of its inclination, are caused to undergo an inward and outward excursion which displaces fluid into an appropriate kidney-shaped port and draws fluid from the other so that the machine operates as a pump.

The term axial-piston machine, therefore, is used to designate both an axial-piston pump and an axial-piston motor.

In conventional systems, the drive flange is carried by the shaft and is supported in at least to axially spaced radially effective roller and ball bearing, and not engaged by an axially effective or thrust bearing. In another construction of the means for journaling this shaft, the latter is engaged by a single radial bearing and is engaged by a radially and axially effective (RADIAX) bearing spaced from the radial bearing.

The resultant of the forces applied by the pistons to the drive flange is thus resolved by the drive flange and shaft into an axial force component and a radial force component which are taken up by these bearings. However, because of the locations of these bearings, remote from the plane of the drive flange, considerably bending moment is applied to the drive flange.

The drive flange thus sustains a moment about a perpendicular to the shaft axis and to take up this moment a second radial bearing is generally required and is frequently provided. The greater the distance between the two radial bearings, the smaller the moment which can be taken up by them. Since large forces develop in axial-piston machines and the bearings thereof are highly loaded, the practice has been heretofore to space the radial bearings apart by relatively large distance, thereby making the apparatus larger than is desirable, increasing the amount of space which is required within the housing to accommodate the drive flange and its bearing system, and reducing the output of the machine per unit volume. A particular disadvantage is the large length of the machine to accommodate widely spaced bearing elements.

OBJECTS OF THE INVENTION

It is the principal object of the present invention to provide, in an axial-piston machine, an improved system for journaling the shaft and drive flange whereby the aforementioned disadvantages are avoided.

Another object of the invention is to provide an improved axial-piston machine having a rotatably journaled drive flange and which is of smaller length than earlier systems.

Another object of the invention is to provide an improved bearing system for the drive flange of an axial-piston machine which minimizes bending stresses to which the drive flange is subject even with large piston forces.

SUMMARY OF THE INVENTION

These objects, and others which will become apparent hereinafter, are attained in accordance with the present invention by a bearing system for an axial-piston machine in which all the radial forces and all of axial forces or force components to which the drive flange is subject are taken up by bearings which directly act upon the drive flange or act upon the latter by a rigid and solid force-transmitting member such as a bearing ring. According to a key feature of the invention, the drive flange is stressed between two oppositely directed and oppositely effective bearings adapted to take up the bending-moment forces applied to this drive flange.

The significance of the present invention does not reside in the fact that only one radial bearing and one axial bearing (or a single combination radial-axial bearing) are provided upon the side of the drive flange against which the pistons react, but in the provision of a bearing arrangement which directly at the drive flange is capable of taking up the resultant forces of the bending or tilting moment which acts upon the side of the drive flange turned toward the cylinder drum.

As noted, an axial bearing can be combined with a radial bearing to provide a single RADIAX or radial-thurst bearing, on this side of the drive flange.

According to a feature of the invention, therefore, the drive flange can be provided with a pair of shoulders on its opposite axial sides, each of which is acted upon by a conical roller bearing serving as a combined radial and thrust bearing. Alternatively, the shaft side of the drive flange can have along its outer periphery or in the gap between the shaft and the drive flange, a conical roller bearing which can be dimensioned to be of large diameter to take up the substantially piston-reaction forces. On the periphery of the drive flange, externally of the region of attack of the piston rod, a second conical roller bearing can be arrayed which takes up only the bearing or tilting moment. The force-effect lines of the forces generated by the pistons are inclined to the axis and cut across the shaft preferably within the drive flange. Consequently two bearings suffice to journal the drive flange provided that the drive flange is stressed between the two bearings and the bearings are designed also to take up the radial forces. The portion of the drive flange against which the roller bodies rest need not be of the same composition as the drive flange but can be, for example, a hardened steel ring which is set into or upon the drive flange body.

According to the invention, a single radial bearing may be provided e.g. around the periphery of the drive flange or in engagement with a shoulder formed along the periphery thereof.

Preferably this radial bearing has its roller bodies acting upon the periphery of the drive flange directly, outside the circle of attack of the piston rod so that this radial bearing has a large diameter and allows a high peripheral speed of the roller bodies with a corresponding increase in the number of roller bodies which can be applied to distribute the specific load (load per roller body). It is also possible to distribute the specific load by using small-diameter roller bodies. Since the radial bearing is provided directly upon the drive flange, it can have a limited axial extent e.g. can lie wholly within the planes defining the opposite axial faces of the drive flange. Advantageously, the roller bearing lies closely adjacent the drive shaft.

As noted previously, the two bearings which take up to the axial forces, i.e. either two pure thrust bearings or two conical-roller bearings, are stressed against one another so that the drive flange is under a compressive stress in the direction in which the tilting force moment develops. Thus there is no play in the drive flange which can result in tilting by these force components. The bearings may be stressed against shoulders or other seating surfaces of the housing and can be under elastic deformation stress against respective bearing races or elastic deformation stress of the roller bodies themselves or of the housing.

According to another feature of the invention, the prestressing forces for the axial bearing are produced by a very stiff spring whose force exceeds the maximum tilting force. Since the maximum amplitude of the tilting force is known, it is also known how much force must be supplied by the spring on the surface of the drive flange facing the cylinder drum. A maximum prestressing force can be provided which avoids unnecessary loading of the drive flange when the machine is operated at minimum pressure so that the bearing is not unduly stressed.

By the use of a spring, any manufacturing tolerances which might otherwise give rise to play and any tolerances which may be required to allow thermal expansion, can be compensated by this deflectible member so that in all operating conditions the drive flange is free from axial play.

BRIEF DESCRIPTION OF THE DRAWING

The above and other objects, features and advantages of the present invention will become more readily apparent from the following description, in which.

SPECIFIC DESCRIPTION

Figure 1:
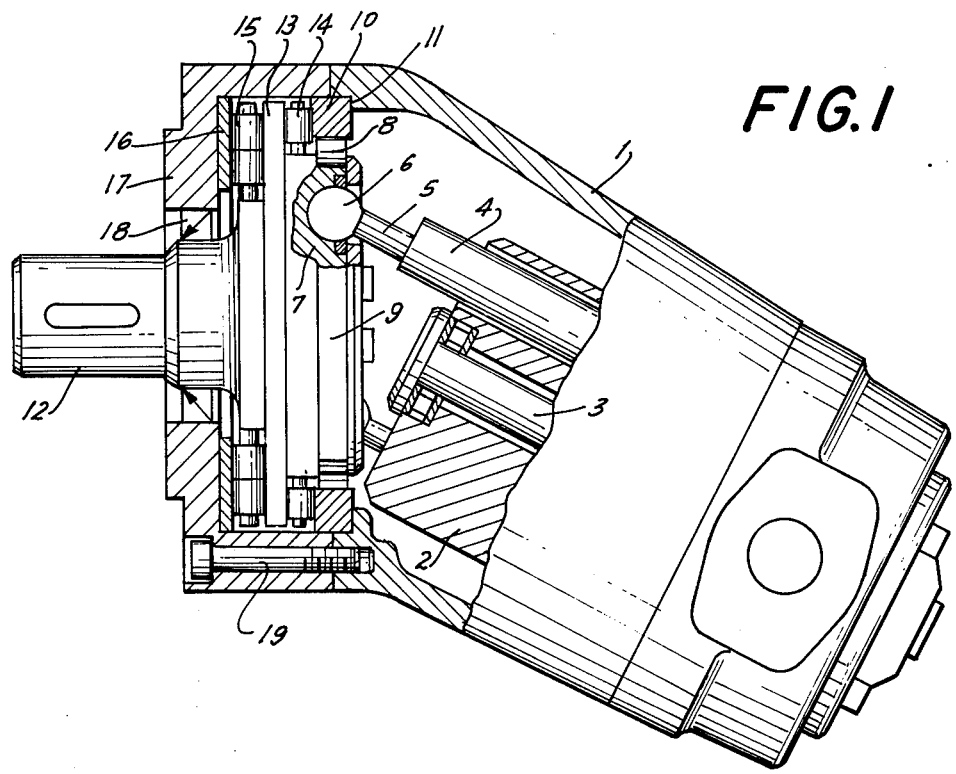
FIG. 1 is a side elevational view of an axial-piston machine, partly in axial cross section and with parts broken away, showing journaling of the drive flange between two axially effective (thrust) bearings and a single radial bearing in the plane of attack of the bass heads of the piston-motor.

In the following description, structurally similar parts for all embodiments have been designated by the same reference numbers.

In general, the axial-piston machine according to the invention comprises a housing 1 in which a cylinder drum is journaled for rotation upon a central shaft or stub 3 whereby the drum is held against a valve plate or distributing plate whose ports communicate with the cylinders of the drum in a conventional manner.

In the cylinder of the cylinder drum 2, pistons 4 are reciprocable parallel to the axis of rotation of the drum, the pistons 4 each having a ball head 6 carried by the respective piston rod and swivelably acting upon a drive flange 7.

The drive flange 7 lies in a plane perpendicular to the input or output shaft 12 of the machine and inclined at an angle to the axis of rotation of the cylinder drum 2.

In the embodiment of FIGS. 1, a single radial bearing 8, having cylindrical rollers, engages a race 9 formed directly in the drive flange 7. The bearing bodies 8 also cooperate with a race ring 10 seated against a shoulder 11 of the housing 1.

The drive flange 7 is also formed with an annular axial facing bearing flange 13, against the opposite side of which a pair of axial bearings (thrust bearings) 14 and 15 are stressed. The axial or thrust bearing 14 has its cylindrical rollers reacting against the radial face of the race 10 while the thrust bearing 15 reacts against a bearing ring or race 16 which is presssed against the housing cover 17. A cylinder 18 in the housing cover cooperates with the shaft 12 to prevent fluid leakage into and out of the system. Since the thrust bearing 15 takes up the major part of the force, it is made with two seats or arrays of bearing bodies and hence has a larger contact surface then the bearing 14. Screws 19 serve to connect the cover 17 to the remainder of housing 1 and apply the necessary prestress to the axial bearings.

Figure 2:
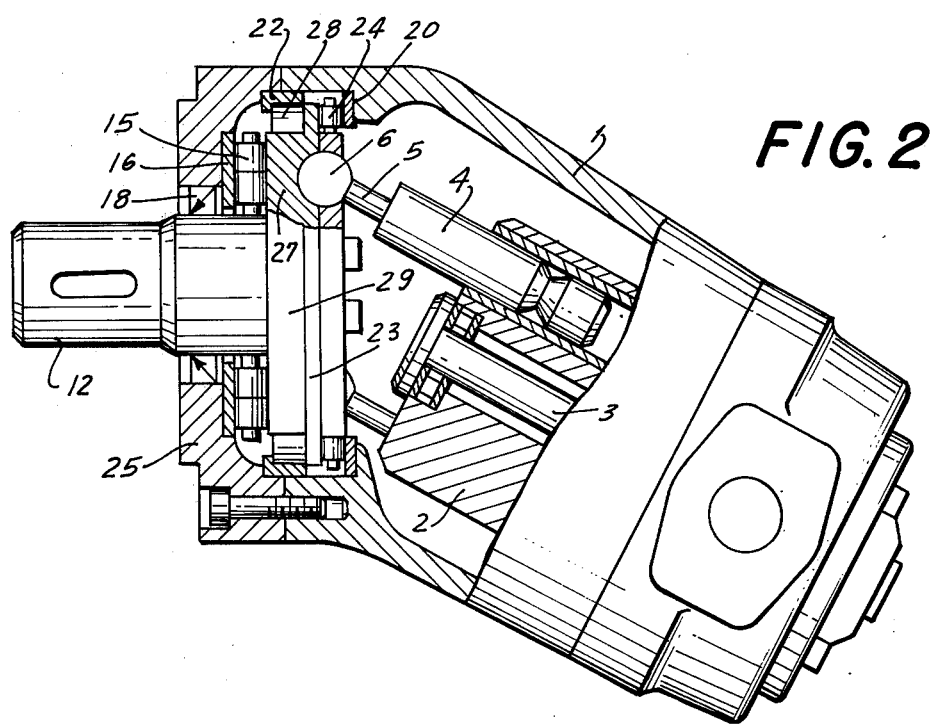
FIG. 2 is a view similar to FIG. 1 in which the drive flange is pressed directly against a thrust bearing and has a radial bearing while a second axial bearing lies against a shoulder of the drive flange.

The embodiment of FIG. 2 differs from that of FIG. 1 in that a cylindrical bearing surface 29 for the radial bearing is machined in the drive flange 27 along the sides thereof turned toward the shaft 2, i.e. on the shaft side of the flange 23. The roller bodies 28 of the radial bearing also cooperate with a race 22 seated in the cover 25 of the housing.

A ring 20 rests against a shoulder similar to that shown at 11 and formed in the housing 1 to support the roller bodies 24 of the thrust bearing disposed on the drum-side of the flange 23 while the larger bearings 15 on the shaft side react against the shaft-side face of the drive flange 27 directly. A ring 16 is here also provided to form a race for the bearing bodies 15.

Figure 3:
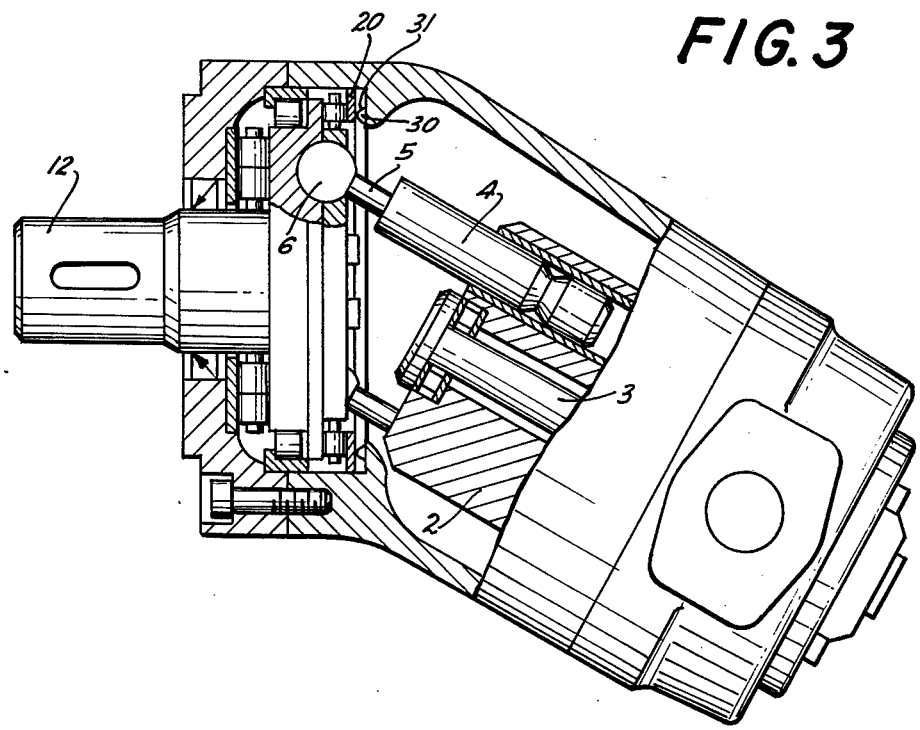
FIG. 3 shows a view similar to FIG. 2 in which a spring is provided to generate the prestressing force.

The arrangement of FIG. 3 differs from that of FIG. 2 only in that between the thrust ring 20 and the shoulder 30 of the housing, an annular spring 31 is provided to generate the prestress for the axial bearings 24 and 25.

The radial bearings of FIGS. 1 through 3 are purely radially loaded while the axial bearings are purely axially loaded, although the system permits a far better distribution of the loading because of the large diameters of the bearings. Relatively small roller bodies can be used in large numbers to take up large forces. The embodiment of FIG. 3 reduces the influence of manufacturing tolerances because the interposition of a spring enables the prestress to be established more accurately than the static stressed systems of FIGS. 1 and 2. Of course, it is possible to provide shims between the bearing ring 16 and the cover 17 to adjust the stressing force with a high degree of exactitude.

Figure 4:
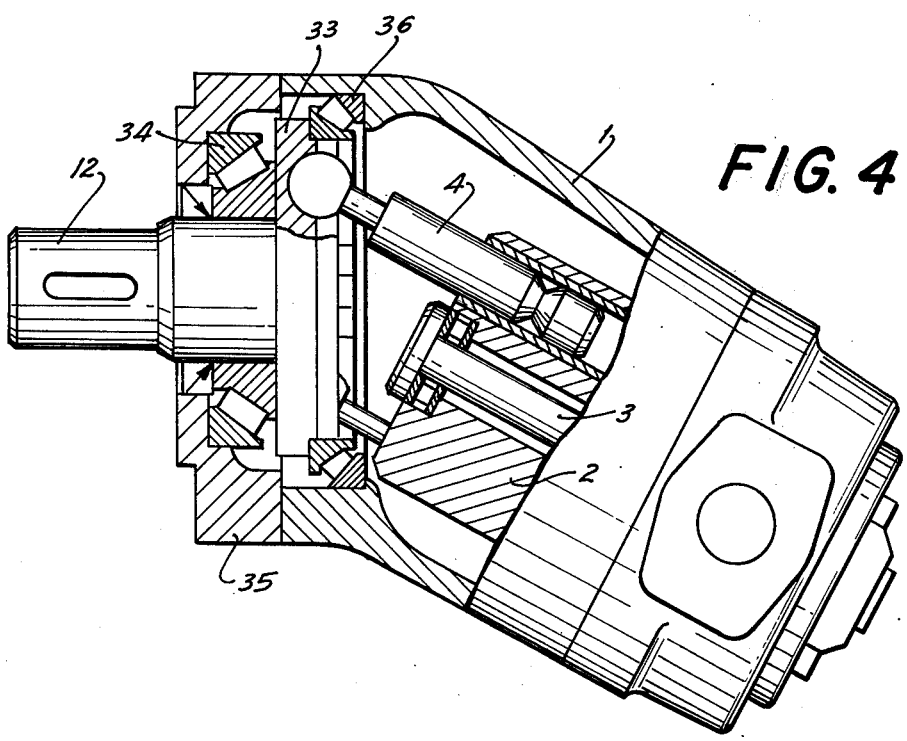
FIG. 4 is a side-elevational view, partly in axial cross-section, with other parts broken away, of an axial-piston machine in which the drive flange is stressed betwen two conical roller bearings.

In the embodiment of FIG. 4, the drive flange 33 is formed on the drum side with a shoulder around the ball head 6 of the pistons 4 which accommodate the inner race of a conical-roller bearing 36, the outer race of which is lodged against a set similar to that shown at 11. A heavier conical roller bearing 34 directly surrounds the shaft 12 and has its inner race seated against the shaft sides of the drive flange 33, the outer race of bearing 34 being received in a shoulder of the cover 35.

The heavy roller bearing 34 takes up the larger part of the axial and radial force component while the bearing 36 serves to take up the tilting-moment forces. Since both bearings 34 and 36 are subjected to radial forces and the bearing 34 is seated in the housing cover 35 while the bearing 36 is seated in the housing 1, it is necessary to provide an exact centering of the cover 35 with respect to the balance of the housing. To this end a centering flange may be provided in one of the two cooperating members (housing and cover) while claws or grooves are provided in the other to accept the flange and it is advantageous to machine the two parts jointly to insure exact centering.

I claim:

1. In an axial-piston machine comprising a housing, a cylinder drum rotatable in said housing about a first axis and having a plurality of pistons reciprocable parallel to said axis, a shaft journaled in said housing for rotation about a second axis inclined to said first axis, a drive flange in said housing secured to said shaft and lying in a plane perpendicular to said second axis and inclined to said first axis, said pistons reacting via piston rods directly against said drive flange, the improvement which comprises bearing means in said housing acting directly upon said drive flange and taking up all of the radial and axial forces thereon, said bearing means including two oppositely directed axially effective roller thrust bearings acting upon opposite sides of said drive flange and reacting against said housing, said axially effective bearings being applied against said drive flange under axial prestress; and a spring acting upon one of said axially effective bearings for applying said prestress to said axially effective bearings and said drive flange.

2. The improvement defined in claim 1 wherein said bearing means includes a single radial bearing supporting said drive flange.

3. The improvement defined in claim 2 wherein said radial bearing is provided around the periphery of said drive flange.

4. The improvement defined in claim 1 wherein said bearing means includes a radial bearing separate from said thrust bearings for taking up radial forces applied to said drive flange 5. An axial piston machine comprising a housing, a cylinder drum rotatable in said housing about a first axis and having a plurality of angularly spaced cylinders formed in said drum generally parallel to said axis, a drive flange inclined to said axis and having the configuration of a substantially flat disk journaled in said housing, respective pistons reciprocally received in said cylinders and being formed with piston rods bearing upon said drive flange at one side thereof, a shaft fixed to said flange and generally perpendicular to said disk at said shaft extending out of said housing, and bearing means for journaling said disk and said shaft in said housing, said housing being formed with annular seats confronting opposite faces of said disk, said bearing means including a first axially effective annular bearing between one of said seats and the respective face of said disk, a second axially effective annular bearing between the other of said seats and the other of said faces of said disk whereby said disk is directly sandwiched between said axially effective bearings, said disk being formed with a cylindrical portion, and a radially effective annular bearing engaging said cylindrical portion of said disk, said radially effective bearing and the axially effective bearing at said one of said sides being disposed outwardly of the region in which said piston rods bear upon said flange, the distance between said bearings and said regions and the distances between the respective bearings being less than the diameter of said disk.

6. An axial piston machine comprising a housing, a cylinder drum rotatable in said housing about a first axis and having a plurality of angularly spaced cylinders formed in said drum generally parallel to said axis, a drive flange inclined to said axis and having the configuration of a substantially flat disk journaled in said housing; respective pistons reciprocably received in said cylinders and being formed with piston rods bearing upon said drive flange at one side thereof, a shaft fixed to said flange and generally perpendicular to said disk at said shaft extending out of said housing, and bearing means for journaling said disk and said shaft in said housing, said housing being formed with annular seats confronting opposite faces of said disk at said one side and the opposite side thereof, said bearing means including a first axially effective annular bearing between one of said seats and the respective face of said disk at said one side outwardly of the reigon at which said piston rods bear upon said flange, and a second axially effective annular bearing between the other of said seats and the other of said faces of said disk whereby said disk is directly sandwiched between said axially effective bearings, said bearing means further being radially effective at said disk.

* * * * *